United States Patent [19]

Wesner

[11] Patent Number: 4,799,163
[45] Date of Patent: Jan. 17, 1989

[54] AUTOPILOT WITH ADAPTIVE WEATHER ADJUSTMENT FOR MARINE VESSELS

[75] Inventor: Charles R. Wesner, Crozet, Va.

[73] Assignee: Sperry Marine Inc., Charlottesville, Va.

[21] Appl. No.: 10,861

[22] Filed: Feb. 2, 1987

[51] Int. Cl.⁴ .............................................. G06F 15/50
[52] U.S. Cl. .................................... 364/457; 318/588; 114/144 RE
[58] Field of Search ............... 364/424, 443, 457, 449, 364/447; 318/588; 114/144 RE

[56] References Cited

U.S. PATENT DOCUMENTS

| | | | |
|---|---|---|---|
| 3,604,907 | 9/1971 | Wesner | 364/432 |
| 3,919,961 | 11/1975 | McDougal | 318/588 |
| 4,069,784 | 1/1978 | Hedström et al. | 114/144 E |
| 4,074,648 | 2/1978 | Reid et al. | 318/588 |
| 4,089,287 | 5/1978 | Kranert et al. | 318/588 |
| 4,253,149 | 2/1981 | Cunningham et al. | 364/444 |
| 4,336,594 | 6/1982 | Masuzawa | 364/457 |
| 4,542,464 | 9/1985 | Kramer | 364/457 |
| 4,692,868 | 9/1987 | Wesner et al. | 318/588 |

Primary Examiner—Parshotam S. Lall
Assistant Examiner—Thomas G. Black
Attorney, Agent, or Firm—Seymour Levine

[57] ABSTRACT

Heading keeping apparatus for a marine vessel autopilot that compares the RMS yaw to a plurality of yaw increments and compares the instantaneous yaw to a plurality of yaw increments to provide respective gain controlling signals in accordance with the increments in which the RMS yaw and instantaneous yaw resides. The gain controlling signal representative of the highest gain is selected to control the gain of the autopilot.

6 Claims, 1 Drawing Sheet

AUTOPILOT WITH ADAPTIVE WEATHER ADJUSTMENT FOR MARINE VESSELS

BACKGROUND OF THE INVENTION

1. Field of the Invention

The invention relates to autopilots for marine vessels, particularly with respect to the heading keeping function thereof.

2. Description of the Prior Art

Numerous autopilots for marine vessels are known in the prior art that include a weather adjustment function. U.S. Pat. No. 3,604,907, issued Sept. 14, 1971 entitled "Steering Command Computer for Navigable Craft", discloses a dual gain autopilot with a semi-automatic weather adjustment function. A manually operated weather adjustment control was set by the operator in accordance with the nominal peak yaw motion experienced by the vessel in response to the severity of the seas. If the yaw motion of the ship exceeded the manual setting, the autopilot gain was increased to restore the ship to the ordered heading. Below the setting a low autopilot gain was utilized for heading keeping. In practice, such manual controls were often set incorrectly or were not set at all. In the prior art autopilots, such manual controls were adjusted to endeavor to optimize performance for varying wind and sea conditions as well as changing ship speeds. With such manual adjustments, however, the operator is frequently unable to realize optimum conditions since the time constants on large vessels are fairly long. With such vessels, it may be necessary to steam for periods of approximately ten minutes before the operator can determine the effect of a manual adjustment. The adjustments, therefore, become a matter of trial and error with a consequent loss in operating efficiency and increase in fuel consumption.

A prior art autopilot endeavoring to provide improved performance by automatically adjusting the autopilot gain in accordance with various sea states and encounter frequencies while maintaining critical damping of the heading control loop is described in U.S. Pat. No. 4,074,648, issued Feb. 21, 1978 entitled "Adaptive Autopilot for Marine Vessels". In the autopilot of said U.S. Pat. No. 4,074,648, the sensitivity of the steering system of the vessel is adjusted to accommodate changes in speed, sea and wind conditions to provide a balance between yaw motion and rudder activity. The autopilot computes RMS yaw motion and RMS rudder motion and adjusts the autopilot gain to minimize the drag function set forth in the patent. This approach requires detailed knowledge of the dynamic coefficients of the vessel and the dynamic performance characteristics thereof. Extensive computer simulation and analysis of ship steering characteristics is required to formulate the algorithm utilized to optimize the operating efficiency of the vessel and is therefore impractical for most ships. Furthermore, if the simulations do not match the actual performance of the vessel, there are no corrections or calibrations available to adjust the predicted performance to the actual performance so that the operating efficiency of the vessel may be compromised.

Another approach to solving the problem of automatically adjusting the autopilot to accommodate various sea states and encounter frequencies is described in pending U.S. patent application Ser. No. 692,465, now U.S. Pat. No. 4,692,868, filed Jan. 18, 1985 entitled "Adaptive Autopilot". Although the autopilot of said Ser. No. 692,465 operated successfully most ships, the device required sailing at constant headings for long periods of time with few heading changes. The autopilot utilized a sequence of trial and error iterative gain changes, RMS yaw motion measurements and comparisons with previous results until the gain was reduced to the level whereby RMS yaw motion increased significantly. Measurement periods were necessarily long, five minutes or longer, because yaw periods tended to be long. Several measurement periods were required to determine the least useable gain and it was necessary to restart the process when a heading change was effected. The autopilot of said Ser. No. 692,465 required significant operating time at non-optimum gain because of the lengthy search procedures utilized.

SUMMARY OF THE INVENTION

The present invention automatically adjusts the gain of the autopilot to accommodate various sea states and encounter frequencies while maintaining critical damping of the heading control loop. The autopilot of the present invention can be calibrated for any ship without prior knowledge of the ship's coefficients or prior computer simulations. The gain search time is significantly less than for prior art devices and the gain range is limited to safe values for all weather conditions. In a manner to be described, the present invention differs from the autopilot of said U.S. Pat. No. 4,074,648 in that gain is a function of yaw motion only instead of yaw motion, rudder angle and a proportionality constant. The present invention differs from the autopilot of said Ser. No. 692,465 now U.S. Pat. No. 4,692,868 in that gain is selected as a direct result of yaw motion computation instead of as a result of a search through various trial gains.

The present invention adjusts the gain of the autopilot in response to changes in yaw motion of the ship. A plurality of gain coefficient sets are established for the particular ship. A first plurality of comparators corresponding, respectively, to a plurality of gain steps, examine the RMS value of yaw motion to determine a gain step corresponding therewith. A second plurality of comparators corresponding, respectively, to the plurality of gain steps, examine the instantaneous value of yaw motion to determine the gain step corresponding therewith. The largest gain step selected by the first and second plurality of comparators is utilized to select one of the sets of gain coefficients to establish the appropriate gain for the heading keeping function of the autopilot.

DESCRIPTION OF THE PREFERRED EMBODIMENT

Figure 1:
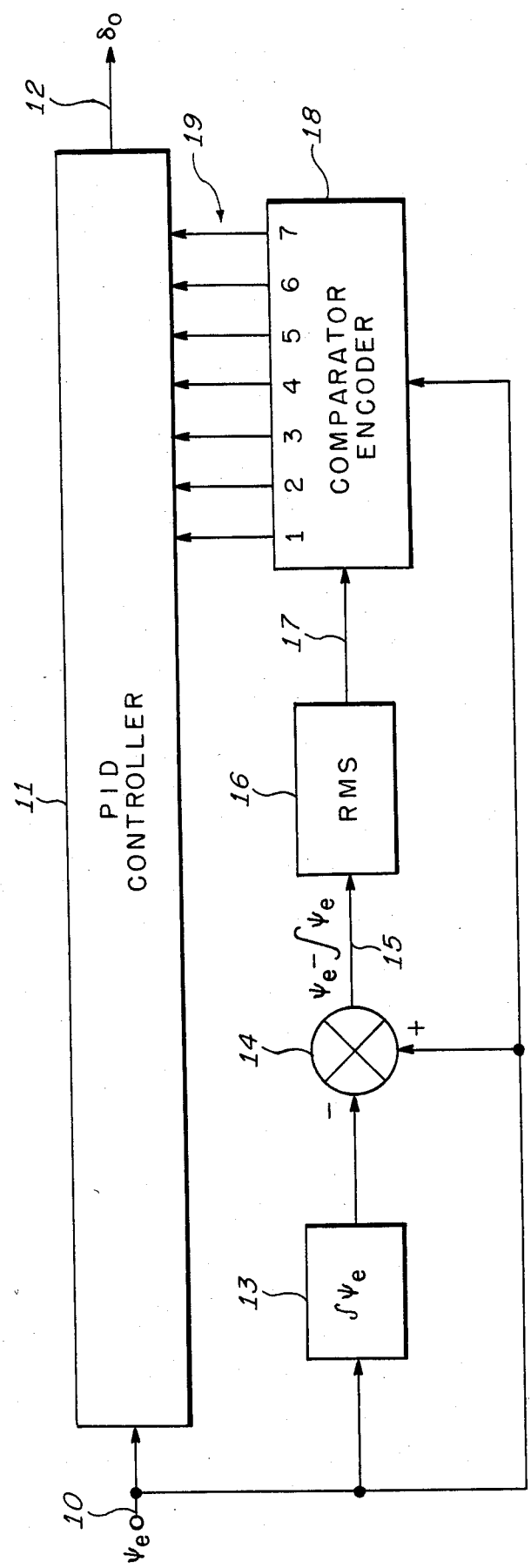
FIG. 1 is a schematic block diagram of an autopilot for marine vessels incorporating the heading keeping apparatus of the present invention.

Referring to FIG. 1, an autopilot for marine vessels implementing the heading keeping algorithm of the present invention is illustrated. It is appreciated that the invention relates to the heading keeping aspects of the autopilot. When a heading change is commanded, the autopilot switches to a heading change or maneuver mode for effecting the alteration in course. When the vessel has attained the new course, the heading keeping algorithm of the invention is again enabled. The heading error signal $\psi_e$ is applied to the autopilot at a terminal 10. The heading error signal is the difference between the commanded heading and the actual heading of the vessel. As is appreciated, the heading error signal is a measure of the instantaneous yaw motion of the vessel. The heading error signal is applied to a conventional PID controller 11. As is well understood, the controller 11 provides an output rudder command $\delta_o$ on a line 12 in accordance with a proportional integral and derivative term of the heading error signal. Thus, the controller 11 receives the heading error signal and in a conventional manner, computes the integral ($\int \psi_e$) and the derivative ($\dot{\psi}_e$) of the heading error signal and sums the three terms with appropriate coefficients to provide the output rudder command on the line 12 in accordance with $$\delta_o = a\psi_e + b\dot{\psi}_e + c\int \psi_e$$

The PID controller 11 is of the type disclosed in said U.S. Pat. No. 3,604,907. The PID controller 11 stores seven sets of coefficients, a, b and c which are established at installation in accordance with the dynamic characteristics of the particular ship.

The heading error signal at the terminal 10 is applied to an integrator 13 which provides the integral thereof to a subtracter 14. The subtracter 14 also receives the heading error signal at a second input thereof and subtracts the heading error integral from the heading error to provide a signal on a line 15 representative of yaw motion only. The yaw signal on the line 15 is applied to an RMS computation block 16 to provide the RMS value of yaw motion on a line 17.

The instantaneous yaw signal at the terminal 10 and the RMS yaw signal on the line 17 are applied as inputs to a comparator-encoder 18. In a manner to be further explained, the comparator-encoder 18 contains six comparators responsive to the RMS yaw signal on the line 17, each having a different threshold level to which the RMS yaw signal is compared, and six comparators responsive to the instantaneous yaw signal at the terminal 10, each having a different threshold level to which the instantaneous yaw signal is compared. The six RMS comparators are configured to detect increments of RMS yaw within a predetermined range of RMS yaw and the six instantaneous yaw comparators are configured to detect increments of instantaneous yaw over a predetermined range of instantaneous yaw.

The gain of the PID controller 11 is quantized into seven gain step levels. Each of the six comparators in the two sets of comparators is representative of one of the gain steps. If none of the comparators in a set is actuated, this condition is representative of the remaining gain step. The block 18 includes a priority encoder responsive to the two sets of comparators to select one of seven logic outputs 19 in accordance with the highest gain step detected by the two sets of comparators. In a manner to be described with respect to FIG. 2, the selected one of the logic outputs 19 selects one of the seven sets of gain coefficients a, b and c stored in the PID controller 11.

Figure 2:
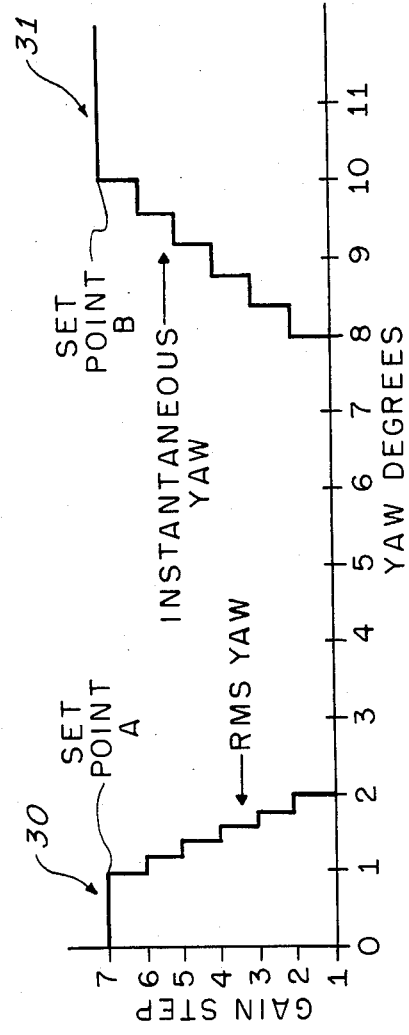
FIG. 2 is a graph of gain steps versus yaw illustrating the operation of the comparator-encoder operation of the present invention.

Referring to FIG. 2, a chart of gain steps versus yaw motion for a typical autopilot implemented in accordance with the invention is illustrated. The chart of FIG. 2 is comprised of a section 30 and a section 31. The section 30 illustrates gain steps versus RMS yaw chosen in accordance with the threshold levels exceeded at the six comparators by the RMS yaw representative signal, and the section 31 illustrates gain steps versus instantaneous yaw chosen in accordance with the threshold levels exceeded at the six comparators by the instantaneous yaw representative signal. The seven gain steps of section 30 are preferably identical to the seven gain steps of section 31. Since the autopilot of FIG. 1 utilizes a PID controller, each gain step of FIG. 2 represents a set of proportional, integral and derivative gains implemented by the previously described seven sets of coefficients a, b and c, respectively. Step 1 provides the minimum gain that will maintain average heading in moderate to rough seas that causes large yaw motions. Step 7 provides maximum gain required to maintain little or no yawing in a calm sea. Set point A is the RMS yaw point at which maximum gain is provided and is selectable, for example, from 0.5 to 1.0 degrees RMS yaw. In the illustrated embodiment, set point A is established at 1.0 degrees. The gain with respect to set point A decreases from the maximum step 7 to the minimum step 1 in six steps, one step for each increment of 0.2 degrees RMS change yaw motion. It is appreciated that the six RMS comparators within the block 18 detect the RMS yaw motion increment in which the RMS yaw signal resides and provides a signal representative of the corresponding gain step. Set point B is selectable, for example, from 5 to 10 degrees instantaneous yaw and in the illustrated embodiment is set at 10 degrees. The gain with respect to set point B decreases to minimum in the six gain steps, one step for each increment of 0.4 degrees instantaneous yaw. It is appreciated that the six gain steps of section 31 of FIG. 2 correspond to the six instantaneous yaw comparators within the block 18. One of these comparators will provide an output in accordance with the instantaneous yaw increment in which the instantaneous yaw signal at the terminal 10 resides, thereby providing a signal representative of the corresponding gain step. As previously described, the comparator-encoder 18 includes a priority encoder that selects the highest gain step of sections 30 and 31 of FIG. 2, thereby providing the corresponding one of seven logic outputs 19. The selected logic output then establishes the corresponding gain coefficients for the proportional, integral and derivative channels of the controller 11.

Typically, autopilot gain will be controlled by the RMS yaw pursuant to section 30 of FIG. 2 and typical yawing will not attain section 31 where gain increases with instantaneous yaw. Section 31 will rapidly restore heading if a large swell forces the instantaneous yaw into this section of the chart. Thus, section 31 becomes active for high sea states that force large yaw excursions. In normal operation, however, the autopilot utilizes section 30.

The minimum gain of step 1, the maximum gain of step 7, set point A and set point B are established at installation during sea trials from the particular ship in which the autopilot is installed or from known characteristics and data established from similar ships. The gain coefficients for the controller 11 are established at installation to provide critical damping in a manner well understood in the art.

In operation, if RMS yaw is less than set point A or instantaneous yaw is greater than set point B, the comparator-encoder 18 selects gain step 7 for establishing maximum gain. If RMS yaw is greater than 2 degrees and instantaneous yaw is less than 8 degrees, none of the comparators within the block 18 are triggered and gain step 1 is selected for establishing minimum gain. The autopilot of the present invention continuously monitors the RMS yaw and the instantaneous yaw and selects the appropriate set of gain coefficients for the controller 11. When RMS yaw decreases from greater than 2 degrees to less than 1 degree, the six RMS comparators within the block 18 will be activated in sequence. Similarly, when instantaneous yaw increases from less than 8 degrees to greater than 10 degrees, the six instantaneous yaw comparators within the block 18 will be activated in sequence. The present invention, therefore, automatically and continuously maintains the gain of the autopilot appropriately adjusted in response to changes in the yaw motion of the ship. An automatic gain control is thereby implemented that responds to RMS yaw to minimize rudder motion in the presence of yaw motion and responds to instantaneous yaw for large heading deviations resulting from large swells. The present invention does not require the gain search of the prior art and therefore the gain settle time for the device is the response time of the RMS computer 16. Typically, this response time is approximatey ten minutes for large ships. In the present invention, gain is a non-linear function of yaw motion such that at low sea states (small yaw motion), gain is a function of RMS yaw and at high sea states (large yaw motion), gain is a function of instantaneous yaw.

An alternative embodiment of the invention may be effected by a modification to the section 30 of FIG. 2 with a corresponding modification in the comparator-encoder 18. The alternative embodiment utilizes a symmetrical mirror image of the RMS curve illustrated starting at step 7 at slightly less than 1 degree RMS and decreasing to step 1 with decreasing RMS yaw intervals. Corresponding encoders would then be included within the block 18 to accommodate this curve. This alternative embodiment does not have a significant effect on performance since when operating on the mirror image curve, the vessel is experiencing insignificant yaw motion. There is little rudder activity as a result of yaw less than 1 degree.

The present invention results in an autopilot that provides fuel savings, requires less skilled operators than the prior art devices and incorporates fewer operator controls. Although the above-described embodiment of the invention has been explained in terms of the schematic block diagram of FIG. 1, it is appreciated that preferably the functions performed thereby and described herein may be readily implemented by an appropriately programmed digital computer. Each of the described functions of the addition, subtraction, integration, RMS function generation and comparison are readily implemented in software.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Heading keeping apparatus for a marine vessel autopilot having an adjustable gain comprising:
   instantaneous yaw means for providing a signal representative of instantaneous yaw motion of said vessel,
   RMS yaw means responsive to said instantaneous yaw means for providing a signal representative of RMS yaw motion of said vessel,
   first comparator means responsive to said RMS yaw signal for providing a first gain step control signal in accordance with first threshold levels exceeded by said RMS yaw signal,
   second comparator means responsive to said instantaneous yaw signal for providing a second gain step control signal in accordance with second threshold levels exceeded by said signal representative of said instantaneous yaw, and
   selector means for selecting said first or said second gain step control signal in accordance with the highest gain associated therewith, thereby providing a selected gain step control signal,
   said selected gain step control signal being utilized to adjust said autopilot gain.

2. The apparatus of claim 1 wherein
   said first comparator means comprises a first plurality of comparators each having a different threshold level for determining which threshold levels are exceeded by said RMS yaw signal, thereby establishing in which of a respective plurality of yaw increments the magnitude of said RMS yaw signal resides and for providing one of a respective plurality of gain step signals corresponding thereto, and
   said second comparator means comprises a second plurality of comparators each having a different threshold level for determining which threshold levels are exceeded by said instantaneous yaw signal, thereby establishing in which of a respective plurality of yaw increments the magnitude of said instantaneous yaw signal resides and for providing one of a respective plurality of gain step signals corresponding thereto.

3. The apparatus of claim 2 wherein said selector means comprises a priority encoder responsive to said gain step signals provided by said first and second plurality of comparators for selecting a gain step thereof having of highest associated gain, thereby providing said selected gain step control signal.

4. The apparatus of claim 3 wherein said autopilot includes adjustable gain proportional, integral and derivative channels responsive to said selected gain step control signal for adjusting a gain of each said channel.

5. The apparatus of claim 1 in which said signal representative of said instantaneous yaw motion of said vessel comprises a heading error signal of said vessel.

6. The apparatus of claim 5 in which said RMS yaw means comprises
   an integrator responsive to said heading error signal for providing an integral thereof,
   substracter means responsive to said heading error signal and said integral thereof for providing a difference therebetween, and
   RMS computer means responsive to said difference for providing a root-mean-square value thereof, thereby providing said signal representative of said RMS yaw motion of said vessel.

* * * * *